US009410803B2

(12) United States Patent
Pernstich et al.

(10) Patent No.: US 9,410,803 B2
(45) Date of Patent: Aug. 9, 2016

(54) OBSERVATION DEVICE WITH A RANGE FINDER (75) Inventors: Ludwig Pernstich, Rum (AT); Konrad A. Rolder, Mils (AT); Andreas Zimmermann, Fulpmes (AT); Gavin Lancaster, Innsbruck (AT)

(73) Assignee: Swarovski-Optik KG. (AT)

( * ) Notice: Subject to any disclaimer, the term of this patent is extended or adjusted under 35 U.S.C. 154(b) by 669 days.

(21) Appl. No.: 12/865,485

(22) PCT Filed: Jan. 30, 2009

(86) PCT No.: PCT/AT2009/000039
§ 371 (c)(1),
(2), (4) Date: Nov. 24, 2010

(87) PCT Pub. No.: WO2009/094689
PCT Pub. Date: Aug. 6, 2009

(65) Prior Publication Data
US 2011/0128619 A1 Jun. 2, 2011

Related U.S. Application Data (60) Provisional application No. 61/137,406, filed on Jul. 30, 2008.

(30) Foreign Application Priority Data

Jan. 31, 2008 (AT) .................................. A 153/2008
Feb. 1, 2008 (AT) .................................. A 163/2008
Feb. 2, 2008 (EP) ..................................... 08001979

(51) Int. Cl.
*G02B 23/00* (2006.01)
*G01C 3/04* (2006.01)
(Continued)

(52) U.S. Cl.
CPC .. *G01C 3/04* (2013.01); *B25G 1/00* (2013.01); *B25G 1/102* (2013.01); *F41G 3/06* (2013.01);
(Continued)

(58) Field of Classification Search
CPC .. G02B 7/06; G02B 7/12; G02B 23/00–23/08
USPC ................................................... 359/404–418
See application file for complete search history.

(56) References Cited

U.S. PATENT DOCUMENTS 3,622,242 A 11/1971 Land et al.
3,680,946 A 8/1972 Bellows
(Continued)

FOREIGN PATENT DOCUMENTS

DE 6918690 U 12/1969
DE 2502662 A1 8/1975
(Continued)

OTHER PUBLICATIONS

Binoculars, Celestron SkyMaster 71009, Mar. 2005.
(Continued)

*Primary Examiner* — Bumsuk Won
*Assistant Examiner* — Jeffrey Madonna
(74) *Attorney, Agent, or Firm* — Lerner, David, Littenberg, Krumholz & Mentlik, LLP (57) ABSTRACT The invention describes an observation device, having two tubular observation parts, wherein the longitudinal axes of the observation parts in the region of the ocular sides are spaced apart by a distance of at least 54 mm. At least one observation part has a flared portion on an external side, wherein the flared portion is located inside a subsection of between 20% and 80% of an overall length of the observation part. The flared portion lies in an annulus section having a normal distance to the optical axis of the objective of between 130% and 250% of the radius the objective lens.

24 Claims, 5 Drawing Sheets (51) Int. Cl.

| | | |
|---|---|---|
| *B25G 1/00* | (2006.01) | |
| *B25G 1/10* | (2006.01) | |
| *F41G 3/06* | (2006.01) | |
| *G01S 7/481* | (2006.01) | |
| *G01S 17/02* | (2006.01) | |
| *G01S 17/08* | (2006.01) | |
| *G01S 17/10* | (2006.01) | |
| *G02B 7/06* | (2006.01) | |
| *G02B 7/12* | (2006.01) | |
| *G02B 23/04* | (2006.01) | |
| *G02B 23/10* | (2006.01) | |
| *G02B 23/18* | (2006.01) | |

(52) U.S. Cl.
CPC .............. *G01S 7/4812* (2013.01); *G01S 17/023* (2013.01); *G01S 17/08* (2013.01); *G01S 17/10* (2013.01); *G02B 7/06* (2013.01); *G02B 7/12* (2013.01); *G02B 23/04* (2013.01); *G02B 23/10* (2013.01); *G02B 23/18* (2013.01); *G01S 7/4817* (2013.01)

(56) References Cited

U.S. PATENT DOCUMENTS

| | | | | |
|---|---|---|---|---|
| 4,262,990 | A * | 4/1981 | Kamakura | 359/422 |
| 4,886,347 | A | 12/1989 | Monroe | |
| 5,126,549 | A | 6/1992 | Yamada | |
| 5,235,458 | A * | 8/1993 | Akagi et al. | 359/410 |
| 5,579,165 | A * | 11/1996 | Michel | F41G 3/02 359/407 |
| 5,610,761 | A * | 3/1997 | Ishibashi | G02B 7/06 359/407 |
| 5,616,903 | A | 4/1997 | Springer | |
| 5,644,425 | A * | 7/1997 | Palmer | G02B 7/021 359/399 |
| 5,771,407 | A | 6/1998 | Imafuji et al. | |
| 5,923,468 | A | 7/1999 | Tsuda et al. | |
| 6,142,636 | A | 11/2000 | Nemoto et al. | |
| 6,204,961 | B1 | 3/2001 | Anderson et al. | |
| 6,233,094 | B1 | 5/2001 | Tsuda | |
| 6,266,185 | B1 | 7/2001 | Miller et al. | |
| 6,292,314 | B1 | 9/2001 | Perger | |
| 6,307,673 | B1 * | 10/2001 | Hirunuma | G02B 7/06 359/416 |
| 6,330,056 | B1 | 12/2001 | Zadravec | |
| 6,580,495 | B2 | 6/2003 | Shirai | |
| 6,753,951 | B2 | 6/2004 | Fukumoto | |
| 6,937,391 | B2 * | 8/2005 | Hirunuma | G02B 23/18 348/E5.024 |
| 7,244,033 | B2 * | 7/2007 | Yamanouchi | 359/513 |
| D579,472 | S * | 10/2008 | Yanagisawa | D16/133 |
| 7,483,208 | B2 | 1/2009 | Zadravec | |
| 7,654,029 | B2 | 2/2010 | Peters et al. | |
| 7,738,082 | B1 | 6/2010 | Peters | |
| 7,999,924 | B2 * | 8/2011 | Watanabe | G01C 3/04 356/3.01 |
| 2001/0028450 | A1 | 10/2001 | Zadravec | |
| 2001/0028498 | A1 | 10/2001 | Haga et al. | |
| 2002/0071126 | A1 | 6/2002 | Shirai et al. | |
| 2003/0002149 | A1 * | 1/2003 | Watanabe | 359/407 |
| 2003/0063209 | A1 * | 4/2003 | Enomoto | G02B 7/06 348/335 |
| 2003/0086072 | A1 | 5/2003 | Fukumoto et al. | |
| 2003/0151660 | A1 | 8/2003 | Hirunuma et al. | |
| 2004/0046953 | A1 | 3/2004 | Nagata et al. | |
| 2005/0036129 | A1 | 2/2005 | Watanabe | |
| 2006/0193039 | A1 | 8/2006 | Yamauchi et al. | |
| 2007/0097351 | A1 | 5/2007 | York et al. | |
| 2007/0174152 | A1 | 7/2007 | Bjornberg et al. | |
| 2008/0007826 | A1 | 1/2008 | Smith et al. | |
| 2009/0141371 | A1 * | 6/2009 | Brown et al. | 359/811 |
| 2009/0201581 | A1 * | 8/2009 | Gebelein | 359/407 |

FOREIGN PATENT DOCUMENTS

| | | |
|---|---|---|
| DE | 2714412 A1 | 10/1978 |
| DE | 29518708 U | 1/1996 |
| DE | 19727988 A1 | 1/1998 |
| DE | 19801519 A1 | 7/1998 |
| DE | 19933172 C1 | 1/2001 |
| DE | 10122936 A1 | 11/2001 |
| DE | 10306282 A1 | 8/2003 |
| DE | 102004054182 A1 | 7/2005 |
| DE | 202006017705 U1 | 1/2007 |
| EP | 0932065 A1 | 7/1999 |
| EP | 0961147 A1 | 12/1999 |
| EP | 1069442 A2 | 1/2001 |
| EP | 1298480 A1 | 4/2003 |
| EP | 1744196 A1 | 1/2007 |
| EP | 1783529 A1 | 5/2007 |
| EP | 2078975 A1 | 7/2009 |
| GB | 1477201 A | 6/1977 |
| GB | 1600191 A | 10/1981 |
| JP | 2002098762 A | 4/2002 |
| JP | 2007127690 A | 5/2007 |
| WO | 8802125 A1 | 3/1988 |
| WO | 9711399 A1 | 3/1997 |
| WO | 0171407 A1 | 9/2001 |

OTHER PUBLICATIONS

International Search Report, PCT/AT2009/000039, dated Jun. 25, 2009.
International Search Report, PCT/AT2009/000037, dated Sep. 30, 2009.
International Search Report, PCT/AT2009/000038, dated Jul. 14, 2009.
"Experience Your Vision", New: Victory RF Binoculars, leaflet published in the Internet, Jan. 14, 2008.

* cited by examiner

OBSERVATION DEVICE WITH A RANGE FINDER

CROSS REFERENCE TO RELATED APPLICATIONS

The present application is a national phase entry under 35 U.S.C. §371 of International Application No. PCT/AT2009/000039, filed Jan. 30, 2009, published in German, which claims the benefit of Austrian Patent Application No. A 153/2008, filed Jan. 31, 2008; Austrian Patent Application No. A 163/2008, filed Feb. 1, 2008; European Patent Application No. 08001979.7, filed Feb. 2, 2008; and U.S. Provisional Application No. 61/137,406, filed Jul. 30, 2008. The disclosures of said applications are incorporated by reference herein.

The invention relates to a long-range optical device, including at least two observation parts, corresponding to the features of the disclosure.

Binoculars with a deflected beam path offset along their longitudinal extension have already become known, in which the hinged bridge parts are fixed to the part of the housing projecting in the direction of the common pivot axis. This housing part projecting radially beyond the tube serves only to accommodate the optics for the beam path.

The problem addressed by the invention is to create a long-range optical device which is designed to accommodate additional components in the observation part.

The problem addressed by the invention is solved by a long-range optical device, in particular an observation device (1), having at least two observation parts (3, 4), which each comprise housing parts (38, 39) with an ocular side (6) and an objective side (5), a longitudinal axis (40, 41) of the observation part (3, 4) extending between the ocular side (6) and the objective side (5), and having at least one observation beam path with an optical axis, in which the observation parts (3, 4) are arranged next to each other essentially parallel and spaced a distance apart via at least one connection element (42, 43), characterized in that in a usage position the longitudinal axes (40, 41) of the observation parts (3, 4) in the region of the ocular sides (6) are spaced apart by a distance (47) of at least 54 mm and the two longitudinal axes (40, 41) define a plane of reference (49), and that at least one observation part (3, 4) in cross-section relative to the longitudinal axis (40, 41) of the observation part (3, 4) has at least one flared portion (36) on an external side (48), wherein surface points of the flared portion (36) are arranged in such a manner that they are located inside a subsection having a longitudinal extension (75) between 20% and 80% of an overall length (51) of the observation part (3, 4) or of the long-range optical device between an ocular-side end (52) and an objective-side end (53) and in an annulus section (56) having a normal distance to the optical axis of the objective (5) and relative to a radius (54) of a lens (55) of the objective (5) between 130% and 250% and within the annulus section (56) relative to the optical axis of the objective (5), which extends starting from a tangent plane (50) across the side facing away from the other observation part (4), wherein the tangent plane (50) is arranged on the external side (48) of the observation part (3, 4) on the side facing the connection element (42, 43) and aligned perpendicular to the plane of reference (49) and parallel to the longitudinal axis (40, 41) of the observation part (3, 4). Accordingly the observation part has at least one flared portion projecting beyond its exterior, in which a very wide range of components can be accommodated in a protected location. The arrangement of the flared portion, in particular on the underside in the usage position, simplifies an additional improvement in the handling for the relative mutual adjustment of the observation parts to each another, since a directed support is facilitated. A multiple advantage is therefore obtained, since the widest range of components can be additionally arranged on or inside the long-range optical device and furthermore, the handling for the user is also simplified. Due to the fact that the flared portion does not extend completely over the entire length of the observation part, the sections facing the user retaining their normal dimensions.

Independently of this the problem addressed by the invention is also solved by a long-range optical device, in particular an observation device (1), having at least two observation parts (3, 4), each comprising housing parts (38, 39) with an ocular side (6) and an objective side (5), a longitudinal axis (40, 41) of the observation part (3, 4) extending between the ocular side (6) and the objective side (5), and having at least one observation beam path with an optical axis, in which the observation parts (3, 4) are arranged next to each other essentially parallel and spaced an adjustable distance apart via at least one connection element (42, 43) about a pivot axis (44), characterized in that at least one observation part (3, 4) has on an external side (48) at least one flared portion (36), which extends inside a sub-region between 20% and 80% of an overall length (51) of the observation part (3, 4) or of the long-range optical device between an ocular-side end (52) and an objective-side end (53), and that in a cross-section relative to the longitudinal axis (40, 41) of the observation part (3, 4) surface points of the region of the flared portion (36) furthest away from the optical axis of the objective (5) have a normal distance to the optical axis, the value of which in relation to a radius (54) of a lens (55) of the objective (5) lies between 130% and 250%, and that the flared portion (36) lies in a region facing away from the pivot axis (44) of a tangent (73, 74) on the external side (48) of the observation part (3, 4), wherein the tangent (73, 74) is aligned perpendicular to a plane (71, 72) defined by the longitudinal axis (40, 41) and the pivot axis (44) and extends in contact with the external side (48) of the observation part (3, 4) facing the pivot axis (44). Due to the fact that the flared portion, viewed in cross-section with respect to the longitudinal axis, is arranged on the side lying opposite to the tangent of the common pivot axis, a region is set aside which serves to support the handling, but the ability of the two observation parts to pivot relative to each other is not affected. The arrangement of the housing extension, in particular on the underside in the usage position, facilitates an additional improvement in the leverage for the mutual adjustment of the observation parts relative to each another, since a directed support is facilitated. A multiple advantage is therefore obtained, since the widest range of components can be additionally arranged on or inside the long-range optical device and furthermore, the handling for the user is also simplified.

Also advantageous is the flared portion extending along the circumference of the observation part in cross-section relative to the longitudinal axis of the observation part by between 5° and 270°, since this means that depending on the components to be accommodated in the flared portion an optimal matching to them can take place.

Another advantageous construction is the flared portion having a wall thickness, which approximately corresponds to a wall thickness of the housing part of a corresponding observation part, which means that with the lowest possible material consumption a stable outer housing can be created while in spite of this, allowing the accommodation of a very wide range of components within the long-range optical device.

Due to the construction of the flared portion being integral with the housing part it is possible to provide a highly stable shell to form the housing parts.

Also advantageous is the flared portion including a separate housing component coupled to the housing part, by means of which the fabrication of the housing parts is simplified and a high level of flexibility can be obtained by the mutually interchangeable housing components.

In the configuration wherein a coupleable plug connection is arranged between the housing component of the flared portion and the housing part, it is advantageous that at the same time as the coupling to the housing part, electrical signals, for example, or power can be transmitted.

Due to the flared portion having a keel-shaped cross-section in a longitudinal section relative to the longitudinal axis of the observation part a sharp edged transition to the two ends of the long-range optical device is avoided and thus the stop surfaces can be smoothed.

Due to the flared portion (36) forming an accommodation space (59) on an inner side facing the longitudinal axis (40, 41), depending on the size of the accommodation space the component or components to be accommodated therein can be fixed in place and additionally protected.

Another advantageous construction is that at least some of the components from the group of beam-forming systems, beam-deflecting systems and range finding devices, navigation systems such as GPS (Global Positioning System), remote communication systems such as W-LAN, Bluetooth, infrared, lasers and radio, energy generating devices, energy accumulators or energy storage devices, thermal imaging devices and mobile communications devices are used, since with this arrangement a range of variation can be created with a very wide range of components or modules.

According to a construction, a communications interface or a connection for a power supply device is arranged on the flared portion (36), and the universal applicability of the overall long-range optical device is increased still further.

The configuration whereby the communications interface is selected from the group of USB, IEEE 1394 (Firewire) or RS 232 has proved to be advantageous since data transfer is facilitated between the components accommodated in the long-range optical device and control and/or computing units or data storage devices located externally thereto.

According to an advantageous construction, a transmission and/or receiver device (63) for the components is arranged in the accommodation space (59) is arranged on the flared portion (36), and a wireless transfer or transmission of data or signals can be effected.

Also advantageous here is a construction whereby at least one lighting means (64) is arranged on the flared portion (36), where additional lighting means, such as torches or similar, can be dispensed with and the long-range optical device can be used as a light emitting device at the same time.

In another construction, the lighting means (64) is selected from the group of LEDs, halogen lamps, xenon burners, incandescent lamps, lasers depending on the lighting means used, the strength of the light can be easily varied.

In the construction whereby at least one display element (65) is arranged on the flared portion (36) or the display element (65) is designed to display at least one value from the group of position coordinates, temperature, illumination strength, air pressure, humidity, sea level, compass points and the charging state, a capability for easily reading displayed data or readings on the outside of the long-range optical device can be obtained.

Also possible in this arrangement is a construction whereby the observation part (3, 4), in particular the housing part (38, 39) thereof, is of a pipe-shaped or tubular construction, which can guarantee an adequate support and simple accommodation of the optical components.

The construction of a thumb recess (37) being constructed on the observation part (3, 4) between the flared portion (36) and the ocular side (6) is advantageous since the handling capability during the observation procedure can be made more ergonomic and the thumb has enough space when placed in the thumb recess.

Also advantageous however is a construction of the thumb recess (37) in longitudinal section relative to the longitudinal axis (40, 41) of the observation part (3, 4) extends inside the cross-section of the pipe-shaped housing part (38, 39), in which a trough-shaped construction can be obtained between the flared portion and the housing part.

Where the observation part (3, 4), in particular the housing part (38, 39) thereof, has almost the same uniform wall thickness (58) of between 0.5 mm and 1.5 mm over its whole length, the lowest possible material consumption is adequate.

Also advantageous is a further embodiment whereby the connection element (42, 43) is formed by hinged bridge parts (45, 46) and the hinged bridge parts (45, 46) 46 are each an integral component of the observation part (3, 4), by means of which firstly an exact machining and alignment of the component is possible, and secondly an exact mutual alignment can be achieved when joining them together.

Also advantageous is a construction whereby the observation part (3, 4) is formed from a light metallic material such as magnesium or a magnesium based alloy, since not only can an extremely stable shell be created, but also therefore the weight can be additionally reduced.

Due to the construction whereby the observation part (3, 4) is formed from a fiber-reinforced plastic, wherein samples of the fibers can be chosen from the group of glass fibers, aramide fibers, carbon fibers, metallic fibers, ceramic fibers or polyimide fibersit is possible to simply adapt the housing of the long-range optical device to very different application conditions.

According to another design variant, the observation part (3, 4), in particular the housing part (38, 39) thereof, has a release (69) on its ocular side (6), which is aligned starting from mutually facing sides of the observation parts (3, 4) in the direction facing away from the connection element (42, 43) and tapering in the direction of the objective side (5), due to the beveling constructed to taper outwards, a simple glove-like fit is obtained for the ocular-side eye muscle, which means that even in colder seasons correct use of the long-range optical device is possible.

Also advantageous is the construction whereby the connection element (42, 43) is constructed as a pivoting connection made of telescopic bridge parts (66, 67) in a direction perpendicular to the longitudinal axis (40, 41) of the observation part (3, 4), since here, without a pivoting motion a change in the inter-eye spacing for adapting to different users is still facilitated.

In the configuration whereby, along the longitudinal extension of the observation parts (3, 4), at least two connection elements (42, 43) are arranged between the ocular side (6) and the objective side (5), and the connection elements (42, 43) and the two observation parts (3, 4) circumscribe an intermediately formed free space (68)it is advantageous that a passage space is created between the connection elements, which enables the handling of the long-range optical device to be made easier and, in particular, more secure.

Due to the construction whereby the observation part (3, 4) has a heating device at least in some areas an even higher level of operator comfort is made possible for the user, even in cold weather.

Due to the construction whereby the device is assigned a motion dynamo and/or a manually activated hand dynamo for generating electrical energy the period of use can be further increased, since when the device is in use a constant charging of the energy storage device occurs.

Due to the construction whereby the centre of gravity of the observation device (1), viewed in longitudinal section with respect to the longitudinal axis (40, 41), is arranged in a longitudinal section (76), which corresponds at least to the section of the thumb recess (37) in the same direction an almost tilt-free support for the observation device is obtained during the observation procedure. In interaction with the thumb recess and the flared portion joined thereto a supporting force counteracting the turning moment is generated, which means a steadier observation procedure is possible that is not subject to blurring.

Also advantageous is a construction whereby the observation part (3, 4) comprises an interface (70) for coupling to a firearm, since this allows individual observation parts to be coupled to a firearm on their own.

According to a construction whereby the connection element (42, 43) coupling the observation parts (3, 4) comprises a coupling device a simple separation of the observation parts from each other is possible. This means an even higher number of possibilities is created for combining different observation parts together.

Finally however a construction whereby each of the observation parts (3, 4) forms an independently usable component in itself is also advantageous, since an even higher flexibility of the long-range optical device can thus be achieved.

To allow a better understanding of the invention this will be explained in more detail with the aid of the following drawings.

In a highly simplified schematic representation, they show.

It should first of all be noted that in the various embodiments described, equivalent parts are assigned identical labels or component designations respectively, the disclosures contained in the entire description being analogously transferable to equivalent parts with identical labels or component designations. Also, the positional details chosen in the description, such as above, below, to the side etc., refer to the immediately described and illustrated Figure, and when there is a change of position are to be carried over analogously to the new position. Further, individual features or feature combinations from the various exemplary embodiments shown and described can also represent, per se, solutions that are independent, inventive or according to the invention.

All information on value ranges in the description of the subject matter are to be understood in the sense that they also comprise any and all sub-ranges thereof, e.g. the range 1 to 10 is to be understood to mean that all sub-ranges, starting at the lower limit 1 and the upper limit 10 are also included, i.e. all sub-ranges begin with a lower limit of 1 or greater and end at an upper limit of 10 or less, e.g. 1 to 1.7, or 3.2 to 8.1 or 5.5 to 10.

Figure 1:
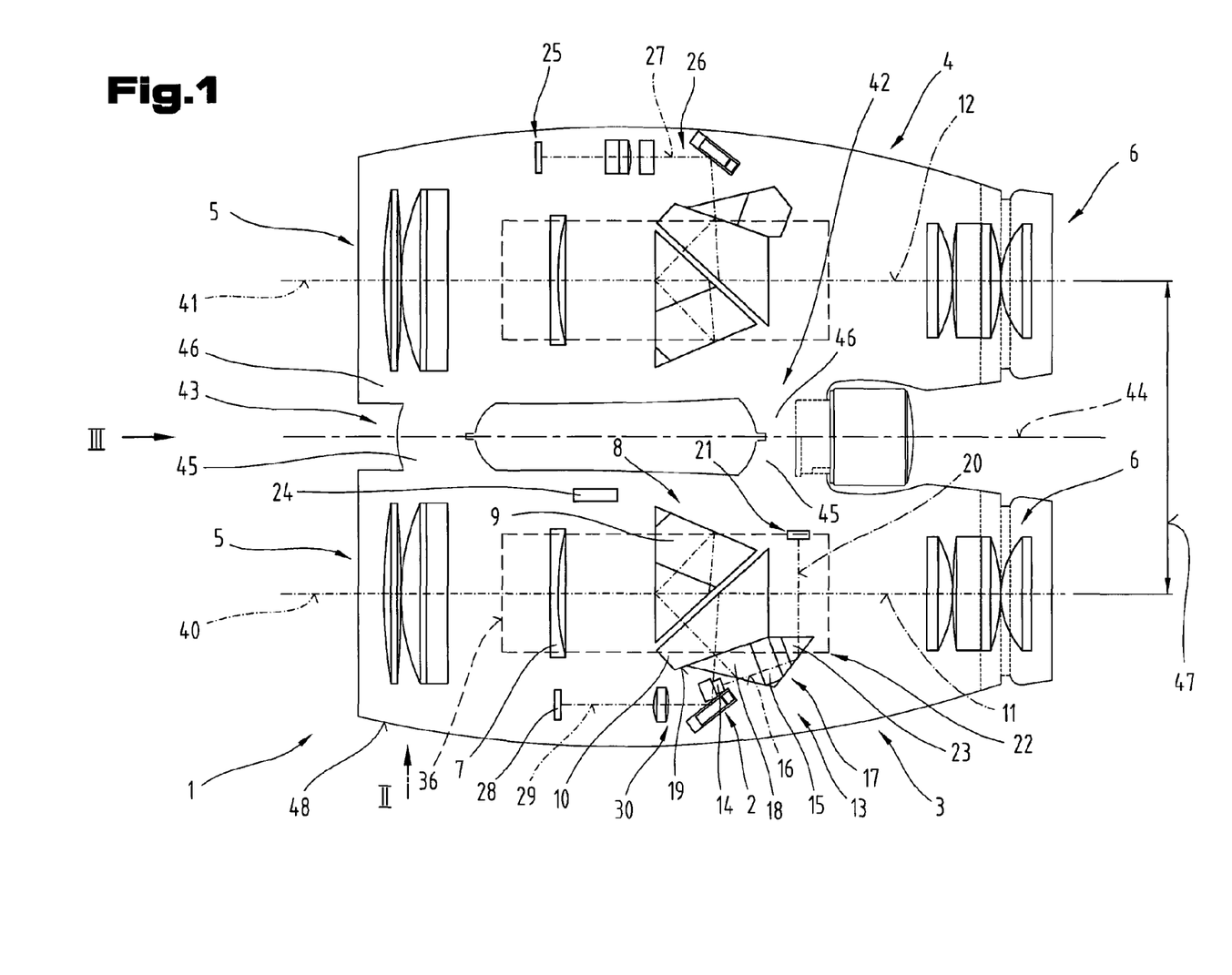
FIG. 1 a long-range optical device with a simplified system of optics and an integrated range finder in a usage position and viewed from above.
Figure 2:
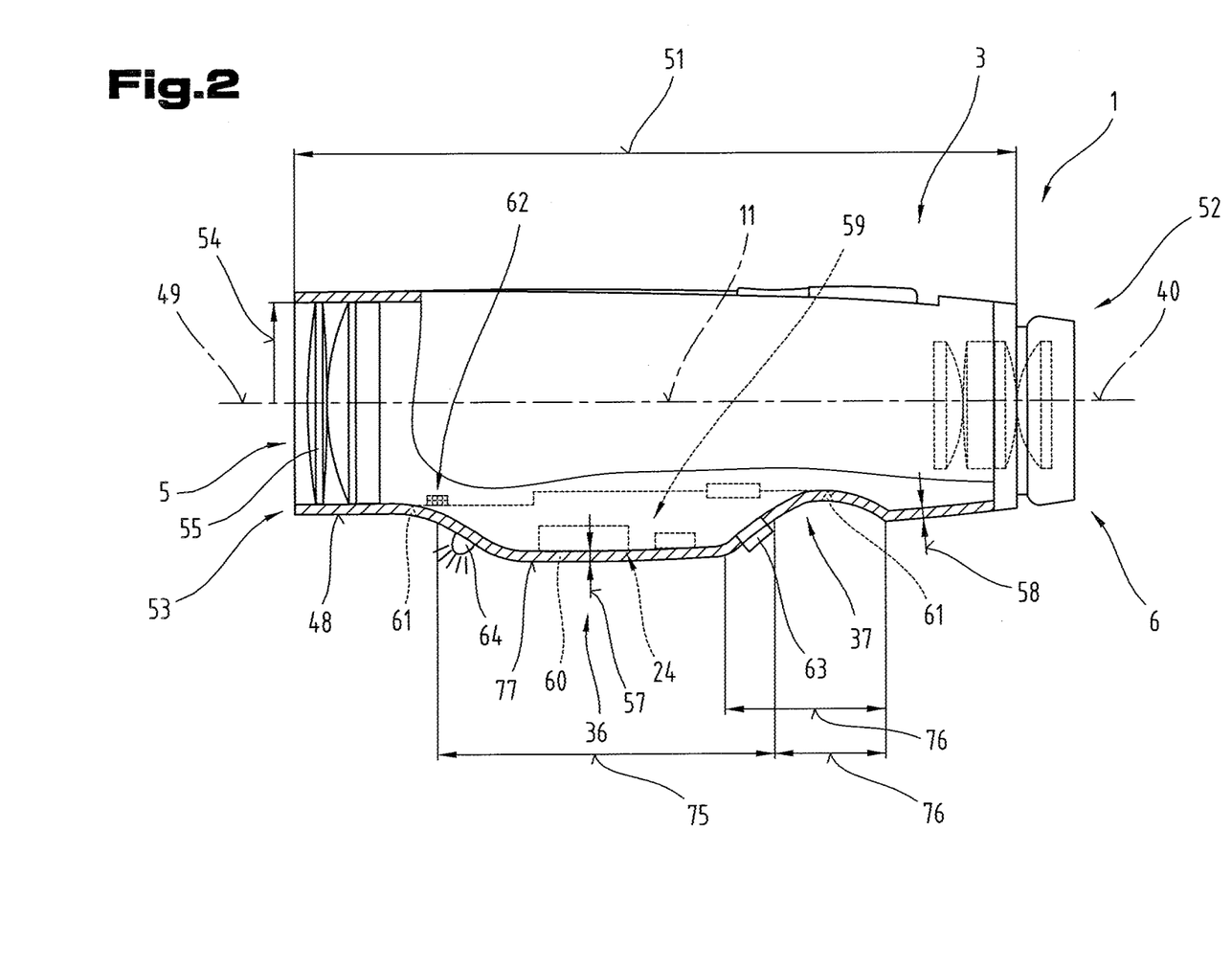
FIG. 2 a side view of the long-range optical device according to arrow II in FIG. 1.
Figure 3:
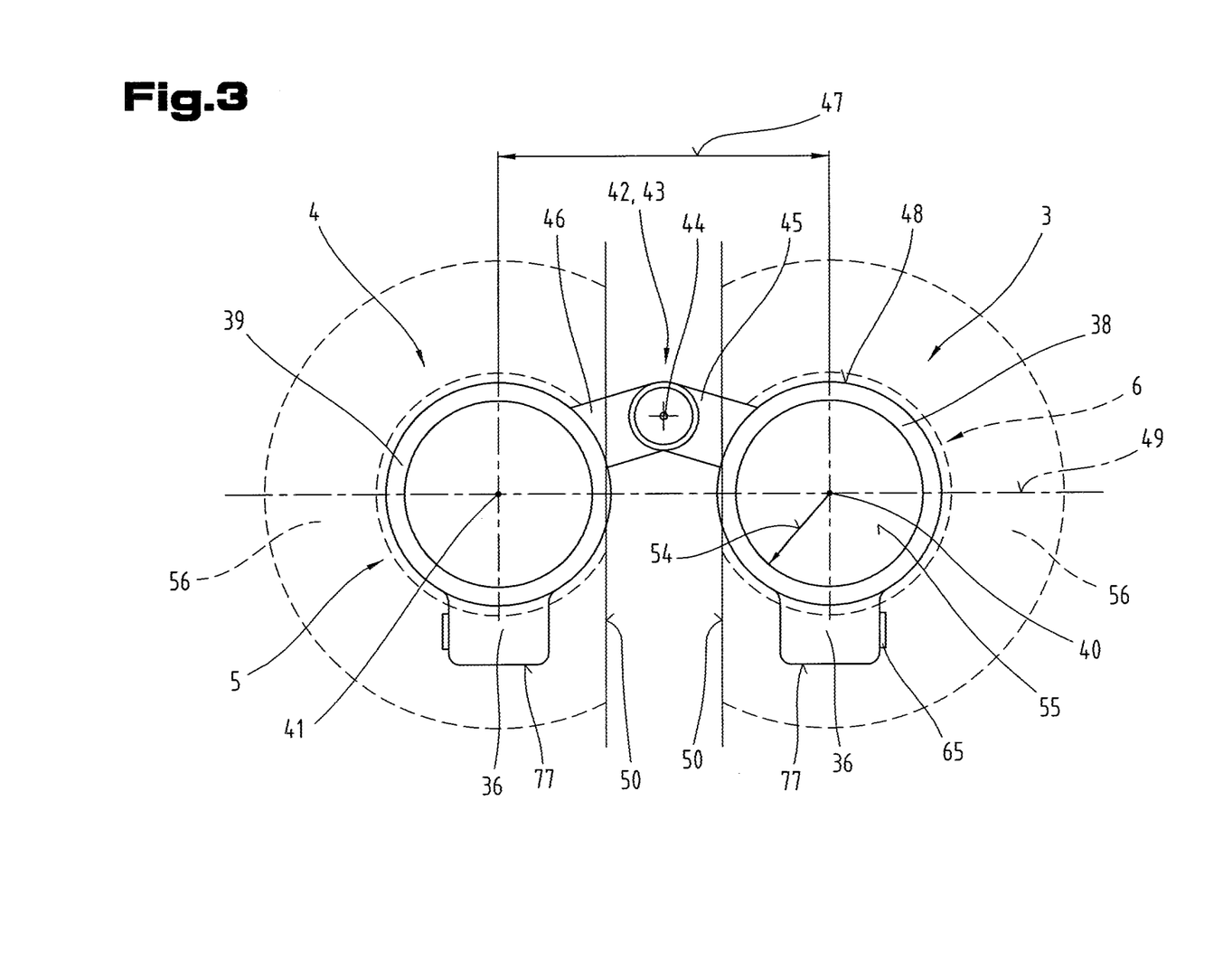
FIG. 3 a side view of the long-range optical device according to arrow III in FIG. 1.

The FIGS. 1 to 3 show an observation device 1, in particular binoculars, but which can also be constructed as a long-range optical device. This can also be formed by a telescopic sight, a theodolite, a leveling device, an optical system for a camera or a camera, photographic equipment or similar. Here the contours are shown as thin solid lines.

The observation device 1 comprises a first observation part 3 and a second observation part 4, which each taken separately form a long-range optical device. With regard to their optical components both observation parts 3, 4 are of identical construction and comprise first of all an objective 5 and an ocular 6 to provide an enlarged representation of an observed object. According to this exemplary embodiment the focus setting is effected by means of a focusing device 7, which is preferably formed by a lens. To represent the observed object upright and with the correct lateral orientation, a reversing system 8 is arranged between the focusing device 7 and the ocular 6. According to this exemplary embodiment the reversing system 8 is formed by a prism system, comprising a roof prism 9 and a deflection prism 10. By means of the cited optical components, a first visual beam path 11 of the first observation part 3 and a second visual beam path 12 of the second observation part 4 are specified. For greater clarity the beam paths 11 and 12 are each shown in simplified form, and symbolized only by the corresponding main beams or the optical axes of the corresponding observation parts 3 and 4.

Independently of this it would also be quite possible for the previously described optical components for forming the visual beam path 11, 12 to be arranged in only one of the two observation parts 3, 4 and different components or component parts to be accommodated inside the additional observation part 4, 3 thereof, which will be described in further detail below.

For the range-finding measurement the first observation part 3 is also a transmission optical system 13 with a laser transmitter 14 and a transmitter optics 15. The laser transmitter 14 is integrated into the first observation part 3 in such a way that a part of a beam path 16 of the laser transmitter 14 is deflected into the first visual beam path 11. In order to deflect the beam path 16 of the laser transmitter 14, optical components are provided in the first observation part 3, which according to this exemplary embodiment are formed by a deflection prism 17 and a splitter prism 18. For this purpose, the splitter prism 18 is arranged on the surface 19 of the deflection prism 10 lying opposite the roof prism 9, or on the surface 19 of the roof prism and connected thereto. The surface 19 forms a beam splitter, by the fact that a partially transparent coating is provided thereon. By means of this coating, a reflection of the visual beam path 11 occurs on the surface 19, whereas the light coming from the laser transmitter 14 is not reflected and passes through the surface 19 without difficulty. The combination of the optical beam path 16 of the laser transmitter 14 with the first visual beam path 11 is therefore localized on the surface 19 of the deflection prism 10, or the splitter prism 18. In order to achieve this the direction of the beam path 16 of the laser transmitter and the direction of the first visual beam path 11 in its objective-side trajectory are co-aligned in the region of, or inside the deflection prism 10. By having the beam path 16 of the laser transmitter 14 also passing the focusing device 7 and the objective 5 in its trajectory towards the object, the laser transmitter 14 or the beam path 16 of the laser transmitter can be focused on the object or in the object plane.

After the reflection of the laser light on a remote object, reflected laser beams jointly re-enter the observation device 1 through the first visual beam path 11. As a result of the partially transparent coating of the surface 19 between the reversing prism 10 and the splitter prism 18, a separation of a beam path 20 of the laser receiver from the first visual beam path 11 takes place at this surface 19. In order to detect and/or measure the reflected laser radiation, a receiver 21 is provided, wherein the laser light is fed through a receiving optical system 22, which according to this exemplary embodiment is formed by the splitter prism 18 and a receiver prism 23. By having the first visual beam path 11 and the beam path 20 of the laser receiver at the surface 19 between the reversing prism 10 and the splitter prism 18 combined or split, a part of the beam path 20 of the laser receiver is thus also integrated into the first visual beam path 11. Thus, in this observation device 1 with a laser range finder 2, to integrate the beam path 16 of the laser transmitter 14 and the beam path 20 of the laser receiver 21 into the first visual beam path 11, optical components are arranged, in which an intersection occurs between the first visual beam path 11 and the beam path 16 of the laser transmitter 14 or the beam path 20 of the laser receiver 21. According to the exemplary embodiment described, the area of the intersection is furthermore localized on a single optical component, namely the surface 19 of the deflection prism 10. Thus both the supply of the laser radiation from the laser transmitter 14, and the separation of the reflected laser radiation from the first visual beam path 11 take place on the single surface 19.

The range measurement is made in the manner known per se, based on the principle of propagation time measurement of a laser pulse or a laser pulse train, which is emitted by the laser transmitter 14. From the ratio of the time difference between the emission of a laser pulse and the arrival of the reflected laser light to the speed of light the range of the sighted object can be found. The arrival time of the reflected laser signal is detected by the receiver 21. A control and analysis unit 24 is provided for the calculation and for controlling the functions of the observation device 1. The value for the range eventually calculated in the control unit 24 can be displayed for the observer in the field of view, by a display element 25 being provided in one of the two observation parts 3, 4 with an appropriate set of display optics 26. The display optics 26 is arranged according to this exemplary embodiment in the second observation part 4 in such a way that the beam path 27 of the display optics 26 is integrated into the ocular-side part of the second visual beam path 12. The region of the intersection of the beam path 27 of the display optics 26 with the second visual beam path 12 is localized, as already described for the reversing system 8 of the first observation part 3, on a partially reflecting surface of a prism.

Furthermore, in order to facilitate the sighting of an object the range of which is to be measured, a target mark 28 is provided in the first observation part 3. The target mark 28 or a beam path 29 to the target mark 28 is relayed via a set of target mark optics 30 provided for the purpose in the ocular-side part of the first visual beam path 11. The area of the intersection of the beam path 29 with the target mark 28 is also localized on the surface 19 lying between the deflection prism 10 and the splitter prism 18.

According to an alternative embodiment it is also possible to integrate the beam path 27 of the display element 25, as well as the beam path 29 to the target mark 28, into the first observation part 3 of the observation device 1. Vice versa, it would also be possible to use the display element 25 itself to generate the target mark 28.

FIG. 2 shows a side view of the observation device 1 or of the long-range optical device according to according to FIG. 1. According to the diagram the observation parts 3, 4 have an approximately tubular basic shape. In a lower region of the observation part 3, 4 this comprises a keel-shaped flared portion 36. Furthermore in a region of the observation part 3, 4 adjoining this and facing the ocular 6, a thumb recess 37 is constructed. The flared portion 36 forms an internal accommodation region for the device electronics, in particular for the control and analysis unit 24. The external shape of the flared portion 36 and the thumb recess 37 also form a particularly convenient ergonomic shape, or gripping arrangement, guaranteeing that the observation device 1 can be held comfortably, resting on the balls of the thumbs.

Furthermore, this shape also has the advantage of improved leverage to the extent that pivoting of the two observation parts 3, 4 of the observation device 1 is facilitated. Likewise in the event of a linear displacement of the observation parts 3, 4 relative to each other the adjustment of the inter-eye distance is improved.

In this exemplary embodiment shown here the two observation parts 3, 4 are formed from housing parts 38, 39 shown in simplified form and extend between the ocular 6 or the ocular side and the objective 5 or the objective side. Furthermore the housing parts 38, 39 between the ocular side 6 and the objective side 5 each define a longitudinal axis 40, 41. With a central mounting of the optical components, in particular the objective 5 and the ocular 6, to a large extent the longitudinal axes 40, 41 extend congruently to the first and/or second visual beam path 11, 12. The first and/or second visual beam path 11, 12 can form an observation beam path, which in turn defines or forms an optical axis.

In order to obtain an almost or completely tilt-free support of the observation device 1, in particular the two observation parts 3, 4, during the observation procedure, it is advantageous if the centre of gravity of the observation device 1, viewed in longitudinal section with respect to the longitudinal axis 40, 41, is arranged in a longitudinal section 76, which corresponds at least to the section of the thumb recess 37 in the same direction. By means of the immediate and subsequent arrangement of the flared portion 36 with the sloping transition region, this longitudinal section 76 can be additionally enlarged in the direction towards the objective side 5. If the centre of gravity, which by definition is given by the optical components inside the observation device 1 or the observation parts 3, 4, lies outside this region in the direction of the objective side 5, then the tilting moment that occurs can be caused by an adequate cupping of the hands or else by supporting the ocular side 6 on the upper forehead bone bounding the eye socket. A workable combination of these can be chosen depending on the observation procedure. Due to the thumb recess 37 matched to the geometry of the thumb in connection with the sloping transition towards the flared portion 36, an additional supporting effect can also be effected here.

In addition, in this exemplary embodiment shown here the two observation parts 3, 4 are arranged next to each other via at least one but preferably multiple connection elements 42, 43 in an essentially parallel arrangement and spaced a distance apart. The connection element or elements 42, 43 can each be formed in a known manner by a hinged bridge, here shown simplified, which define or form a pivot axis 44. the hinged bridge can in turn comprise hinged bridge parts 45, 46, which form the common pivot axis 44 in the end regions facing each other and at the ends facing away from them are each connected to the observation part 3, 4 or the housing part 38, 39 thereof. Preferably the hinged bridge parts 45, 46 are each an integral component of the observation part 3, 4, in particular the housing part 38, 39 thereof. If the housing part 38, 39 is manufactured for example by a precision casting process, these can be constructed at the same time as the manufacturing process the housing parts 38, 39 and thus be formed directly thereon.

In a standard usage position of the observation device 1 or the long-range optical device the longitudinal axes 40, 41 of the observation parts 3, 4 in the region of the ocular sides 6 are spaced apart by a distance 47. This distance 47 can also be referred to as a so-called inter-eye distance, which in ophthalmology is equivalent to the distance between the centers of the pupils of both eyes. The human inter-eye distance is currently 62 mm on average (for men) and also varies only very slightly between highly different constitution types and body sizes. In women the inter-eye distance can be somewhat smaller at for example 54 mm. There are approximately 5% of women for whom this distance 47 is below 54 mm. The distance 47 here is related to the longitudinal axes 40, 41 of the observation parts 3, 4, wherein with a central mounting of the ocular 6 this corresponds to the optical axis of the beam path 11 and/or 12 in the region of the ocular 6. This usage arrangement or position serves to allow further definition of the arrangement of the flared portion 36 on an outer side 48 of the observation part 3, 4 or housing part 38, 39. Thus for example the distance 47 can have a value at a lower limit of 52 mm and a value with an upper limit of 66 mm. Here the distance 47 only plays an important part in the case of observation parts 3, 4 that are pivotable at an angle, since due to the pivoting motion the position of the components arranged on the external side 48, such as for example the flared portion 36, changes relative to each other or also with respect to the pivot axis 44.

The longitudinal axes 40, 41 or the optical axes of the two observation parts 3, 4 define in the previously described distance 47 a plane of reference 49 lying in the two longitudinal axes 40, 41, as can best be seen from FIG. 3. Thus the two longitudinal axes 40, 41 fix the plane of reference 49. On the side facing the pivot axis 44 or the connection element 42, 43 a tangential plane 50 is shown in simplified form, which is therefore arranged tangential to the housing part 38 on the side facing the additional observation part 4 on the first observation part 3. This means that the tangential plane 50 is also aligned perpendicular with respect to the plane of reference 49 and mostly parallel with respect to the longitudinal axis 40.

The arrangement and construction of the previously described flared portion 36 can best be seen from a visual comparison of FIGS. 2 and 3. Thus in FIG. 3 one is shown in the region of the observation part 3, shown here on the right.

The flared portion 36 projects here beyond the outer surface of the housing part 38, 39 in the region of its exterior 48, wherein the housing part 38, 39 is most commonly a tubular or pipe-like component. The flared portion 36 for its part in turn has surface points arranged in such a way that they [lie] inside a sub-region at a lower limit of 20% and an upper limit of 80% of an overall length 51 of the observation part 3, 4 or the long-range optical device between an ocular-side end 52 and an objective-side end 53. This sub-section shown here of the flared portion 36 has been assigned the reference label 75 over its whole longitudinal extent. This region can preferably be arranged roughly centrally with respect to the overall length 51 of the observation part 3, 4. A directed approach would also be possible however to the objective side 5 and/or ocular side 6, which means a directed displacement of the centre of gravity relative to the longitudinal axis 40, 41 is facilitated, viewed in relation to the tilt-free support.

The longitudinal extent of the flared portion 36 is shown in simplified form in FIG. 2. Thus the flared portion 36 can have a keel-shaped cross-section in a longitudinal section relative to the longitudinal axis 40, 41 of the observation part 3, 4. The flared portion 36 then projects beyond the usually pipe-shaped or tubular exterior 48 on to the side facing away from the longitudinal axis 40, 41. This keel-shaped, or what could also be termed a fin-like construction, is effected when, starting from the highest elevation of the flared portion 36, this is aligned so as to taper towards the objective side or ocular side 5, 6, and thus angled with respect to the longitudinal axis 40, 41.

The previously described surface points of the flared portion 36 can here be arranged at a normal distance between a lower limit of 130% and an upper limit of 250% to the optical axis of the objective 5 with respect to a radius 54 of a lens 55 of the objective 5. Depending on the wall thickness of the housing parts 38, 39 with the protective elements additionally arranged thereon and described in more detail below, the range of values of the radius 54 can be either even smaller or greater than the limits previously given. Thus the lower limit can e.g. can be around 110% to 120%. This is useful in case observation devices 1 with a smaller objective diameter are used. The radius 54 can also be fixed by the free or clear diameter of the objective however, and thus related thereto. This means that those surface points having the largest radial distance relative to the longitudinal axis 40, 41, lie within the previously described limits. Independently of this it would also be possible for individual surface points or region of the flared portion 36 to project radially beyond the indicated maximum limit, while the majority of the flared portion 36 lies within the given limits. The Radius 54 of the lens 55 is usually equal to and/or smaller than an inner dimension of the housing part 38, 39 in the region of the objective-side end 53. The value of the radius 54 is preferably related in interaction with the lens 55 to the base body for accommodating the optical components, wherein the housing parts 38, 39 forming the base body can at least in some areas, preferably completely however, be enclosed by at least one enclosing element to protect them. Furthermore, additional protective parts or protective enclosures can be arranged on the base body. These can be e.g. protective caps and tubular protective elements in the region of the objective side 5 and/or ocular side 6. All of these previously mentioned protective elements serve not only to protect against blows and scratches, but can also serve to provide additional stiffening of the overall base body, in particular the housing parts 38, 39. The thicker or stronger the protective parts are in relation to the radius 54, the more the flared portion 36 will project beyond the base body or the housing parts 38, 39. The enclosing element is preferably arranged in such a way that it also covers the flared portion 36 and can be formed both integrally or from multiple parts from a very wide range of known materials.

Viewed circumferentially with respect to the longitudinal axis 40 or the optical axis of the objective 5, the flared portion 36 can in turn be arranged in an annulus section 56, which viewed in a radial direction extends inside the previously described limits and ends at the tangential plane 50, also previously described, on the side facing the additional observation part 4. The annulus section 56 thus extends from the tangential plane 50 relative to the optical axis of the objective 5 over the entire side of the first observation part 3 facing away from the other observation part 4.

The other tangential plane 50 assigned to the second observation part 4 is arranged or aligned in a mirror-inverted manner relative to the pivot axis 44 on the second observation part 4. The flared portion 36 of the second observation part 4 is preferably arranged or constructed in the same previously described limits and extends in turn from the tangential plane 50 assigned to the second observation part 4 over the side facing away from the first observation part 3.

In this way the possible method of arrangement of the flared portion 36 is fixed within the previously described limits and ranges. The circumferential extent of the flared portion 36 itself can extend only over a sub-region of the annulus section 56, up to the entire annulus section 56. This extent can in cross-section relative to the longitudinal axis 40 or 41 of the observation part 3 or 4 for example lie between a lower limit of 5° and an upper limit of 270°.

Since the observation part 3, 4 is usually involves a housing part 38, 39 manufactured by a casting or injection molding process, it is advantageous if the flared portion 36 has a wall thickness 57 which roughly corresponds to a wall thickness 58 of the housing parts 38 or 39. The wall thickness values used here relate exclusively to the preferably metallic housing part 38, 39 and the flared portion 36, without additional covering or protective coatings. This means that, due to the flared portion 36 an accommodation space 59 is constructed on its inner side facing the longitudinal axis 40 or 41. The flared portion 36 can itself be an integral component of the housing part 38 or 39, as is shown in solid lines in FIG. 2.

Independently of this it would also be possible to form the flared portion 36 by a separate housing component 60, to be coupled to the housing part 38 or 39. To achieve a sealing of the entire housing part 38 or 39 with the coupleable housing component 60 a sealing element 61, shown simplified, can be provided. This sealing element 61 can serve not only to create a secure seal with first or second observation parts 3, 4 and the optics, or the other components previously described accommodated therein, but at the same time also fulfill a locking or coupling function. The sealing element 61 is preferably constructed as a continuous part covering the entire circumference of the housing component 60 without gaps. The sealing element 61 can thus be constructed as a stand-alone component, or rather arranged on the flared portion 36 and/or the housing part 38 or 39, in particular formed thereon. The housing component 60 could also be constructed to circumferentially cover the entire annulus section 56, wherein however the flared portion 36 viewed in cross-section only covers a partial region thereof. This means that the housing component 60 is designed to be a removable component, which extends over the cross-section in the predefined limits, but the flared portion 36 being constructed shorter to allow this. Thus identical housing parts 38, 39 are constructed for accommodating the housing component 60 and depending on the housing component 60 that is used, with the flared portion 36 arranged thereon, a different arrangement relative to the housing part 38, 39 is achieved.

If a coupleable, and if necessary removable, housing component 60 is provided to form the flared portion 36, a corresponding protective covering of the first or second observation part 3, 4, not shown in more detail, can also have an outline corresponding to the sealing element 61, in order to facilitate a trouble-free removal or re-attachment.

A continuous covering element, also not shown in detail, having a removable or fold out construction for carrying out the removal or attachment procedure from the housing part 38 or 39, would also be conceivable. After a completed manipulation this can be arranged over the flared portion 36 so as to form a seal over it again.

The observation part 3 or 4, in particular the housing part 38, 39 thereof, is preferably constructed with almost the same uniform wall thickness 58 over its whole length, wherein this can lie between a lower limit of 0.5 mm and an upper limit of 1.5 mm. These values relate to housing parts 38, 39 or the housing component 60, when this is formed from a light metallic material such as magnesium or a magnesium based alloy. It would also be possible to form the observation part 3, 4, in particular the housing parts 38 or 39 thereof, and where appropriate the housing component 60 from a fiber-reinforced plastic, wherein samples of the fibers can be chosen from the group of glass fibers, aramide fibers, carbon fibers, metallic fibers, ceramic fibers or polyimide fibers. These previously given limits for the wall thickness 58 relate exclusively to those of the housing parts 38,39 with no additional protective or enclosing elements arranged thereon. These would further increase the overall wall thickness.

In addition, as is now best seen from FIG. 2, a thumb recess 37 is constructed between the flared portion 36 and the ocular side 6 on the observation part 3 or 4. In a horizontal position or alignment of the plane of reference 49 the thumb recess(es) 37 is (are) arranged or constructed on the underside of the observation device 1, in particular of the long-range optical device. In this arrangement the thumb recesses 37, viewed in longitudinal section relative to the longitudinal axis 40, 41 of the observation part 3, 4 extend inside the cross-section of the pipe-shaped housing part 38, 39. The thumb recess 37, in particular of that part wall of the housing part 38, 39, therefore projects into the interior of the observation part 3, 4.

The thumb recess 37 serves to ensure a good grip behavior and associated secure handling of the long-range optical device. This applies not only for the period of the observation procedure, but also when the device is being carried or held with one hand, simply because the thumb can be better supported and positioned in this trough or recess. The thumb recess 37 can also additionally serve to reduce the perimeter thickness of the observation device 1 or long-range optical device, in order to facilitate its secure support also when used by persons with smaller hands, and in particular, thumbs and index fingers.

The thumb recess 37, when viewed circumferentially relative to the longitudinal axis 40, 41 can also extend over a certain angular range, starting from the underside and in a horizontal arrangement of the plane of reference 49 preferably to both sides in the direction of the plane of reference 49.

The accommodation space 59 formed by the flared portion 36 inside the first or second observation part 3, 4 can in turn be used to accommodate a very wide range of individual components or modules, which can be chosen from the group comprising beam-forming systems, beam-deflecting systems and range finding devices, navigation systems such as GPS (global positioning system), remote communication systems such as W-LAN, Bluetooth, infrared, lasers and radio, energy generating devices, energy accumulators or energy storage devices comprising at least one electrical energy accumulator that can be in the form of a primary or secondary storage element, thermal imaging devices and mobile communications devices. A laser transmitter or a projector, for example, can serve as a beam-forming system. Beam-deflecting systems include mirrors, prisms, lenses or similar. Some of these components are shown in FIG. 2 simplified and schematically by dashed lines.

In order to establish connection to the component or components arranged in the accommodation space 59 and/or to the modules previously described in detail in FIG. 1, it is advantageous if a coupleable plug connection 62 is arranged between the coupleable housing component 60 of the flared portion 36 and the housing part 38 or 39. This plug connection 62 is shown in FIG. 2 in simplified form by dashed lines on the side of the flared portion 36 facing the objective 5, and located internally.

In order to be able to establish a communication connection to the different components previously described and arranged in the accommodation space 59, a communication interface or a connection for a power supply device or a power supply unit can be arranged on the flared portion 36. This is not shown in detail however for the sake of clarity. Thus for example the communication interface can be chosen from the group USB, IEEE 1394 (Firewire) or RS 232.

In addition it can also be advantageous if a transmission and/or receiver device 63 for the component or components arranged in the accommodation space 59 is provided or arranged on and/or in the flared portion 36. Independently of this however, a lighting means 64 could also be provided or arranged on the flared portion 36. This lighting means 64 can for example be chosen from the group of LEDs, halogen lamps, xenon burners, incandescent lamps, lasers etc. The laser can be used for target illumination. The necessary power supply and the corresponding activation means for this can in turn be arranged on the flared portion 36 or in the accommodation space 59.

It is further shown in simplified form in FIG. 3, that at least one further display element 65 can be arranged on the flared portion 36. This display element 65 is electrically connected to corresponding measurement or calculation devices in and is used to display individual values from the group position coordinates, temperature, illumination strength, air pressure, humidity, sea level, compass points and the charging state. With the display of the charging state, for example the remaining available electrical energy of the energy storage device, such as a battery or a rechargeable battery, can be visually represented. The display element 65 can be arranged as a separate component on the external side of the flared portion 36 and/or serve as a separate display for superposition on or fading into the optical beam path. Equally it would also be possible, however, to equip the long-range optical device in combination with an inclinometer and so to apply it with the previously described laser-based range finder and with the compass for simple surveying work. Using suitable calculation methods the horizontal and/or vertical distances can then be calculated.

Figure 4:
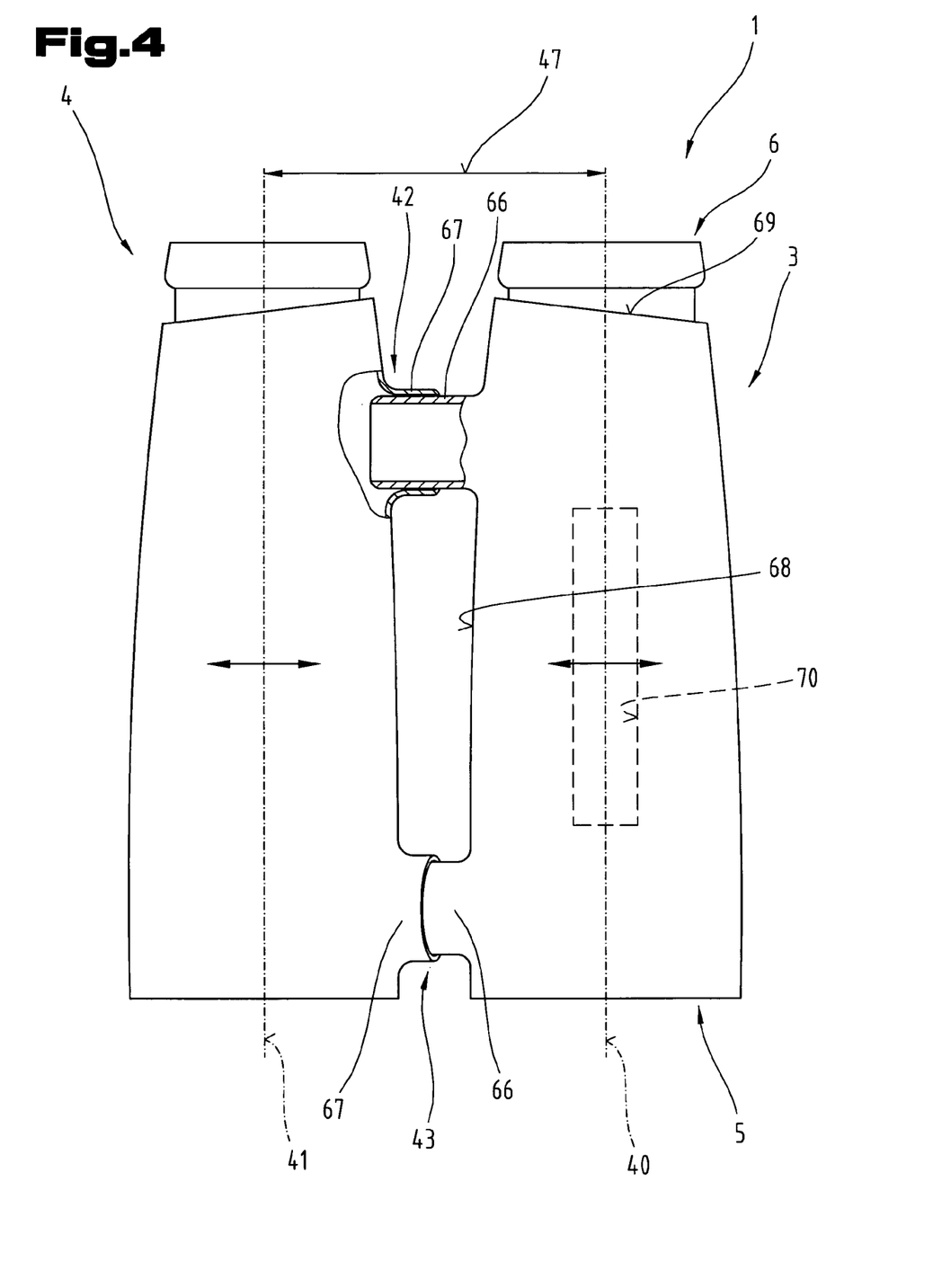
FIG. 4 an observation device with an alternative embodiment of the inter-eye width adjustment.

In FIG. 4 the long-range optical device, in particular the observation device 1 is shown in a plan view in the position of use, wherein again identical labels or component designations are used for equivalent parts as in the preceding FIGS. 1 to 3. In order to avoid unnecessary repetitions, reference is made to the detailed description in the preceding FIGS. 1 to 3.

FIG. 4 shows an observation device 1 with an alternative embodiment of the inter-eye width adjustment of the two observation parts 3, 4. Here between the observation parts 3, 4 at least one telescopic connection is provided, which enables a linear displacement of the observation parts 3, 4 relative to each other in a direction perpendicular to the longitudinal extensions of both observation parts 3, 4.

The connection element or elements 42, 43 are in this case, in contrast to the previously described embodiment, now constructed in the form of a pivoting connection made of telescopic bridge parts 66, 67 in a perpendicular direction relative to the longitudinal axis 40, 41 of the observation part 3, 4. The previously described distance 47 between the longitudinal axes 40, 41, in particular in the region of the ocular side 6, can thus in turn be adjusted to different inter-eye distances of the user.

If in longitudinal extension of the long-range optical device, in particular the observation parts 3, 4 thereof, at least two connection elements 42, 43 are provided, spaced apart from each other between the ocular side 6 and the objective side 5, then the connection elements 42, 43, interacting with the two observation parts 3, 4 on the sides facing each other, circumscribe between themselves an intermediately formed free space 68. The free space 68 can serve as a passage between the observation parts 3, 4 for handling the long-range optical device and offers great advantages, since each of the two observation parts 3, 4 can thus be easily grasped as desired, and therefore securely held. This construction is also shown in simplified form in FIG. 1.

It is further shown in the region of the ocular side 6 that the observation part 3, 4, in particular the housing part 38, 39 thereof, has a release 69 which is aligned starting from mutually facing sides of the observation parts 3, 4 or housing parts 38, 39 thereof in the direction facing away from connection element 42 or 43 and tapering in the direction of the objective side 5. This means that the housing parts 38, 39 in the previously described usage position on their ocular-side end 52 are aligned so that they taper outward away from the side facing the connection element 42.

In the previously described constructions of the long-range optical device it can prove to be advantageous if the observation part 3 and/or 4 at least in some areas has a heating device, not shown in detail here, on the external side or else in the region of the housing part 38 or 39. The corresponding power supply for this can be realized by the previously described energy accumulator accommodated in the flared portion 36. Additionally it would also still be possible to assign the long-range optical device, in particular one of the observation parts 3 and/or 4, a motion dynamo and/or a manually activated hand dynamo for generating electrical energy, in order to thus supply suitable energy to, and so in turn charge up, the energy accumulator while the device is being used and subject to the associated motion.

Figure 5:
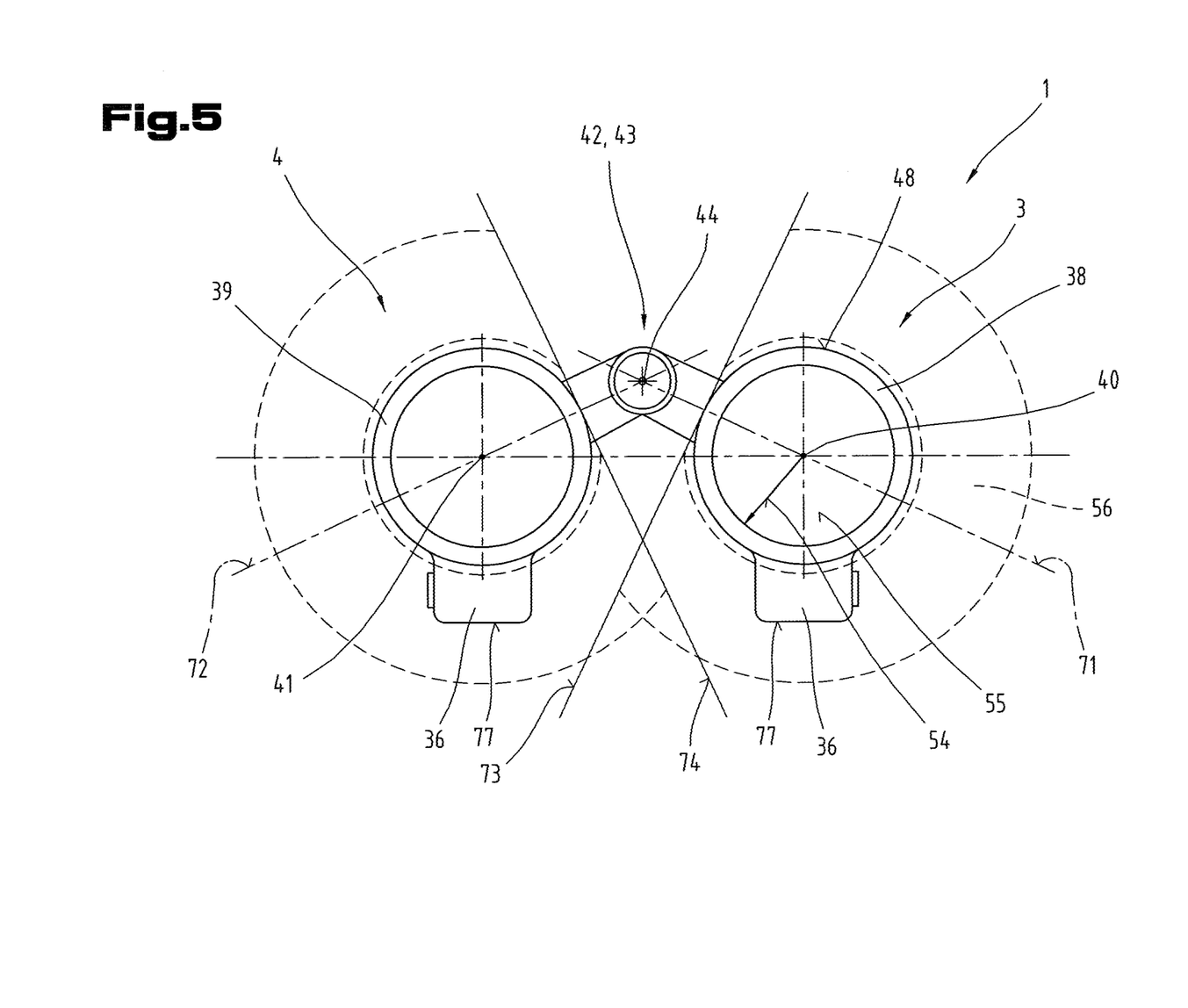
FIG. 5 a view of the objective of the long-range optical device with a further possible arrangement of the flared portion.

In FIG. 5 the long-range optical device, in particular the observation device 1, is shown looking towards the objective 5, wherein again identical labels or component designations are used for equivalent parts as in the preceding FIGS. 1 to 4. In order to avoid unnecessary repetitions, reference is made to the detailed description in the preceding FIGS. 1 to 3.

The long-range optical device shown here again comprises the two observation parts 3, 4 with their housing parts 38, 39 and the longitudinal axes 40, 41 defined by these. The two housing parts 38, 39 are in turn pivotably coupled or connected together in the region of the pivot axis 44 via connection elements 42, 43.

In contrast to the illustration in FIG. 3, to define or specify the arrangement region of the flared portion 36 on the housing part 38 or 39 the previously described plane of reference 49, which was defined by the two longitudinal axes 40, 41 is not used, but rather additional planes 71, 72 that are aligned differently to these are defined. Thus the first plane 71 is defined by the longitudinal axis 40 of the first observation part 3 and the common pivot axis 44. The other or second plane 72 by contrast is defined by the longitudinal axis 41 of the second observation part 4 and again by the common pivot axis 44. To specify the arrangement region of the flared portion 36 therefore, the previously required distance 47 between the two oculars 6 is no longer needed.

The arrangement of the flared portion 36 on the observation parts 3, 4 can be effected analogously to this, as has already been previously described in detail in FIGS. 1 to 3. The circumferential arrangement in cross-section relative to the longitudinal axis 40, 41 of the observation part 3, 4 takes place in such a way that surface points of the region of the flared portion 36 furthest away from the optical axis of the objective 5 have a normal distance to the optical axis, the value of this normal distance in relation to the radius 54 of the lens 55 of the objective 5 lying between 130% and 250%. The previously described deviations in limits are allowed, should this turn out to be necessary. The previously described annulus section 56 is defined by these two limits. In contact with the external side 48 of the housing part 38,39, each of the two housing parts 38, 39, or both observation parts 3, 4, is assigned a tangent 73, 74. Of these the tangent 73 is assigned to the first observation part 3 and the other tangent 74 to the other or second observation part 4. Thus the first tangent 73 viewed in cross-section is arranged between the longitudinal axis 40 and the common pivot axis 44 in contact with the external side 48. The other tangent 74 is analogously aligned extending between the other longitudinal axis 41 and the common pivot axis 44 in contact with the second observation part 4. The flared portion 36 is then located in a region facing away from the pivot axis 44 of the tangent 73, 74 in contact with the external side 48 of the observation part 3, 4.

The tangent 73 or 74 is arranged not only in contact with the external side 48, but it also extends in cross-section perpendicular to the plane 71 or 72 assigned thereto, and in contact with the external side 48 of the observation part 3, 4 facing the pivot axis 44.

The arrangement of the flared portion 36 in cross-section relative to the longitudinal axis 40, 41 on the housing part 38, 39 is therefore fixed independently of the relative position of the two observation parts 3, 4 to each other.

Not just one flared portion 36 can be arranged on the observation part 3, 4, but multiple such flared portions 36 can also be provided on the respective observation part 3 and/or 4, viewed circumferentially. It would equally be possible to construct the flared portion 36 continuously on the side of the tangent 73,74 facing away from the pivot axis 44.

Independently of this, it would also still be possible to assign a coupling device, if necessary detachable, to all previously described embodiments in the region of the connection elements 42 coupling the observation parts 3, 4 and/or 43, or to construct one there, in order to separate the two observation parts 3, 4 from each other and if necessary combine them together again to form a binocular observation device or long-range optical device. The possibility is thus created to construct each of the two observation parts 3 and/or 4 as an independently usable component in itself. If for example the first observation part 3 is equipped with an optical system, which forms the visual beam path 11, the first observation part 3 can be used on its own for example as a telescopic sight for a firearm and be connected thereto. For this purpose it is advantageous if the observation part 3, 4 comprises an interface 70 for coupling to a firearm, which is indicated in simplified form in FIG. 4 by dashed lines in the first observation part 3.

In all the previously described embodiments however it is also possible to arrange multiple such flared portions 36 distributed over the circumference within the previously defined annulus section, in order to create the facility to arrange multiple independent functional components on the observation part 3, 4 and if these are designed to be coupleable, if possible to be able to exchange these with currently unused functional components. This means that a high degree of flexibility is obtained and for the relevant users the facility is created to tailor and to construct the long-range optical device, in particular the individual observation parts 3, 4, individually to the respective user's personal requirements.

The flared portion 36 can for example be arranged and constructed on only one of the observation parts 3, 4 or also on both observation parts 3, 4. The possible arrangements of the flared portion 36 on the two observation parts 3, 4 relative to each other can be different but also mirror-inverted in terms of the position relative to the pivot axis 44.

It can also be particularly advantageous if at least individual components or modules of the two observation parts 3, 4 formed therefrom are constructed in the same way and preferably also symmetrically relative to the pivot axis 44. The two housing parts 38, 39 are preferably constructed symmetrically or mirror-inverted relative to the common pivot axis 44, wherein only differences in the construction and arrangement of the connection elements 42, 43 or the hinged bridge parts 45, 46 can result.

The exemplary embodiments show possible variant embodiments of the binocular observation device 1 or the long-range optical device, at which point it should be pointed out that the invention is not limited to the variant embodiments of the devices specifically illustrated, but rather that various combinations of the individual variant embodiments among themselves are also possible, and due to the teachings on technical activity by invention in the relevant subject matter, this possibility of variation lies within the expertise of a person skilled in the art in this technical field. There are also therefore any number of conceivable variant embodiments, which are possible by combinations of individual details of the variant embodiment illustrated and described, also included in the scope of protection.

For the sake of completeness it should be finally pointed out that to allow a better understanding of the structure of the binocular observation device 1 or the long-range optical device, these or their component parts have been partially illustrated not to scale and/or enlarged and/or reduced in size.

The problem addressed by the independent inventive solutions can be understood from the description.

In particular, the individual embodiments shown in FIGS. 1 to 2, 3, 4, 5 form the subject matter of independent solutions according to the invention. The corresponding problems and solutions according to the invention can be understood from the detailed descriptions of these Figures.

LIST OF REFERENCE LABELS

1 Observation device
2 Laser range finder
3 First observation part
4 Second observation part
5 Objective
6 Ocular
7 Focusing device
8 Reversing system
9 Roof prism
10 Deflection prism
11 First visual beam path
12 Second visual beam path
13 Transmitter optical system
14 Laser transmitter
15 Transmitter lens
16 Beam path
17 Deflection prism
18 Splitter prism
19 Surface
20 Beam path
21 Receiver
22 Receiver optical system
23 Receiver prism
24 Control and analysis unit
25 Display element
26 Display optics
27 Beam path
28 Target mark
29 Beam path 30 Target mark optics
36 flared portion
37 Thumb recess
38 Housing part
39 Housing part
40 Longitudinal axis
41 Longitudinal axis
42 Connection element
43 Connection element
44 Pivoting axis
45 Hinged bridge part
46 Hinged bridge part
47 Spacing
48 External side
49 Plane of reference
50 Tangential plane
51 Overall length
52 Ocular-side end
53 Objective-side end
54 Radius
55 Lens
56 Annulus section
57 Wall thickness
58 Wall thickness
59 Accommodation space
60 Housing component
61 Sealing element
62 Plug connector
63 Transmission and/or receiver device
64 Lighting Means
65 Display element
66 Bridge part
67 Bridge part
68 Free space
69 Release
70 Interface
71 Plane
72 Plane
73 Tangent
74 Tangent
75 Longitudinal extent
76 Longitudinal section
77 Surface of the flared portion

The invention claimed is:

1. A long-range optical device comprising at least two observation parts, each accommodated within a tubular or pipe-like housing part with an ocular side and an objective side and a longitudinal axis extending between the ocular side and the objective side, and having at least one observation beam path with an optical axis, at least one connection element arranged between the housing parts so that the housing parts are arranged essentially parallel to each other and spaced a distance apart from each other, wherein said distance between the longitudinal axes together with the housing parts is adjustable, wherein in a usage position the longitudinal axes of the housing parts in the region of the ocular sides are spaced apart by a distance of at least 54 mm and in said usage position the longitudinal axes define a plane of reference, and that at least a first housing part in cross-section relative to its longitudinal axis has at least one flared portion on an outer surface beside the at least one connection element, said flared portion projects beyond the outer surface of the tubular or pipe-like first housing part, wherein the flared portion forms an accommodation space on an inner side facing the longitudinal axis for a beam-deflecting system comprising a prism, wherein the flared portion is formed by a separate housing component which is integrally formed with the housing part, and a surface of the flared portion is located inside a subsection having a longitudinal extension between 20% and 80% of an overall length of the housing part or of the long-range optical device between an ocular-side end and an objective-side end, and said surface of the flared portion being located in an annulus section having a normal distance to the optical axis of the objective and relative to a radius of a lens of the objective between 130% and 250%, and said surface of the flared portion being located within a spatial section being delimited by a tangent plane, said spatial section facing away from a second housing part, wherein the tangent plane is arranged on the outer surface of the first housing part on the side facing the connection element, wherein the tangent plane is aligned perpendicular to the plane of reference and parallel to the longitudinal axis of the first housing part.

2. The long-range optical device according to claim 1, wherein the flared portion extends along the circumference of the housing part in cross-section relative to the longitudinal axis of the housing part by between 5° and 270°.

3. The long-range optical device according to claim 1, wherein the flared portion has a wall thickness, which approximately corresponds to a wall thickness of the housing part of a corresponding observation part.

4. The long-range optical device according to claim 1, wherein the flared portion is integral with the housing part.

5. The long-range optical device according claim 1, wherein the flared portion comprises a separate housing component coupled to the housing part.

6. The long-range optical device according to claim 5, wherein a coupleable plug connection is arranged between the housing component of the flared portion and the housing part.

7. The long-range optical device according to claim 1, wherein the flared portion has a keel-shaped cross-section in a longitudinal section relative to the longitudinal axis of the housing part.

8. The long-range optical device according to claim 1, wherein the housing part comprises a tubular construction.

9. The long-range optical device according to claim 1, wherein the housing part comprises a thumb recess between the flared portion and the ocular side.

10. The long-range optical device according to claim 9, wherein the center of gravity of the observation device viewed in longitudinal section with respect to the longitudinal axis, is arranged in a longitudinal section, which corresponds at least to the section of the thumb recess in the same direction.

11. The long-range optical device according to claim 9, wherein the thumb recess in longitudinal section relative to the longitudinal axis of the housing part extends inside the cross-section of the pipe-shaped housing part.

12. The long-range optical device according to claim 1, wherein the housing part has a wall thickness of between 0.5 mm and 1.5 mm over its whole length.

13. The long-range optical device according to claim 1, wherein the connection element is formed by hinged bridge parts and the hinged bridge parts are each an integral component of the housing part.

14. The long-range optical device according to claim 1, wherein the housing part includes a taper on its ocular side, which is aligned starting from mutually facing sides of the housing parts in a direction facing away from the connection element and tapering in the direction of the objective side.

15. The long-range optical device according to claim 1, wherein the connection element comprises a pivoting connection made of telescopic bridge parts in a direction perpendicular to the longitudinal axis of the housing part.

16. The long-range optical device according to claim 1, wherein the observation part comprises an interface for coupling to a firearm.

17. The long-range optical device according to claim 1, wherein each of the observation parts forms an independently usable component.

18. The long-range optical device according to claim 1, wherein along the longitudinal extension of the observation parts at least two connection elements are arranged between the ocular side and the objective side, and the connection elements and the two observation parts circumscribe an intermediately formed free space.

19. The long-range optical device according to claim 1, wherein the housing part together with the flared portion is enclosed by an enclosing element.

20. A long-range optical device comprising at least two observation parts, each accommodated within a tubular or pipe-like housing part with an ocular side and an objective side and a longitudinal axis extending between the ocular side and the objective side, and having at least one observation beam path with an optical axis, at least one connection element arranged between the housing parts so that the housing parts extend essentially parallel to each other and are pivotable about a pivot axis, wherein a distance between the longitudinal axes of the housing parts is adjustable,
- wherein at least a first housing part has at least one flared portion on an outer surface besides the at least one connection element,
- said flared portion projects beyond the outer surface of the tubular or pipe-like first housing part,
- wherein the flared portion forms an accommodation space on an inner side facing the longitudinal axis for a beam-deflecting system comprising a prism,
- wherein the flared portion is formed by a separate housing component which is integrally formed with the housing part,
- and said flared portion extends inside a sub-region at a lower limit of 20% and an upper limit of 80% of an overall length of the housing part or the long-range optical device between an ocular-side end and an objective-side end,
- and that in cross-section relative to the longitudinal axis of the first housing part, a surface of the flared portion furthest away from the optical axis of the objective has a normal distance to the optical axis, the value of this normal distance in relation to the radius of the lens of the objective lying between 130% and 250%,
- and that the flared portion lies in a spatial section located on one side of a tangent, said tangent being in contact with the outer surface of the first housing part,
- said spatial section being delimited by said tangent and facing away from the pivot axis,
- wherein the tangent is aligned perpendicular to a plane defined by the longitudinal axis and the pivot axis,
- and the tangent extends in contact with the outer surface of the first housing part facing the pivot axis.

21. The long-range optical device according to claim 20, wherein the housing part together with the flared portion is enclosed by an enclosing element.

22. A long-range optical device comprising at least two observation parts, each accommodated within a tubular or pipe-like housing part with an ocular side and an objective side and a longitudinal axis extending between the ocular side and the objective side, and having at least one observation beam path with an optical axis, at least one connection element arranged between the housing parts so that the housing parts are arranged essentially parallel to each other and spaced a distance apart from each other, wherein said distance between the longitudinal axes together with the housing parts is adjustable,
- wherein in a usage position the longitudinal axes of the housing parts in the region of the ocular sides are spaced apart by a distance of at least 54 mm
- and in said usage position the longitudinal axes define a plane of reference,
- and that at least a first housing part in cross-section relative to its longitudinal axis has at least one flared portion on an outer surface beside the at least one connection element,
- said flared portion projects beyond the outer surface of the tubular or pipe-like first housing part,
- wherein the flared portion forms an accommodation space on an inner side facing the longitudinal axis at least for a beam-deflecting systems of the observation beam path, wherein the beam-deflecting system comprises a prism,
- and a surface of the flared portion is located inside a sub-section having a longitudinal extension between 20% and 80% of an overall length of the housing part or of the long-range optical device between an ocular-side end and an objective-side end
- and said surface of the flared portion being located in an annulus section having a normal distance to the optical axis of the objective and relative to a radius of a lens of the objective between 130% and 250%
- and said surface of the flared portion being located within a spatial section being delimited by a tangent plane, said spatial section facing away from a second housing part,
- wherein the tangent plane is arranged on the outer surface of the first housing part on the side facing the connection element,
- wherein the tangent plane is aligned perpendicular to the plane of reference and parallel to the longitudinal axis of the first housing part.

23. The long-range optical device according to claim 22, wherein the flared portion comprises a separate housing component which is integrally formed with the housing part.

24. The long-range optical device according to claim 23, wherein the housing part together with the flared portion is enclosed by an enclosing element.

* * * * *